(12) United States Patent  (10) Patent No.: US 8,599,151 B2
Narita  (45) Date of Patent: Dec. 3, 2013

(54) INFORMATION PROCESSING APPARATUS AND INFORMATION PROCESSING METHOD

(75) Inventor: Tomoya Narita, Kanagawa (JP)

(73) Assignee: Sony Corporation, Tokyo (JP)

( * ) Notice: Subject to any disclaimer, the term of this patent is extended or adjusted under 35 U.S.C. 154(b) by 420 days.

(21) Appl. No.: 12/621,600

(22) Filed: Nov. 19, 2009

(65) Prior Publication Data

US 2010/0134412 A1    Jun. 3, 2010

(30) Foreign Application Priority Data

Dec. 2, 2008 (JP) ................................ P2008-307661

(51) Int. Cl.
 *G06F 3/041* (2006.01)
 *G09G 5/00* (2006.01)
(52) U.S. Cl.
 USPC .......................................... 345/173; 345/1.3
(58) Field of Classification Search
 USPC ....................................................... 345/156
 See application file for complete search history.

(56) References Cited

U.S. PATENT DOCUMENTS

| 6,788,292 B1 * | 9/2004 | Nako et al. ............... 345/173 |
| 2009/0024039 A1 * | 1/2009 | Wang et al. ................ 600/459 |

FOREIGN PATENT DOCUMENTS

| JP | 10-161619 | 6/1998 |
| JP | 11-272656 | 10/1999 |
| JP | 2003-216300 | 7/2003 |
| JP | 2003-263144 | 9/2003 |
| JP | 2006-323859 | 11/2006 |
| JP | 2007-333973 | 12/2007 |
| JP | 2009-217415 | 9/2009 |
| JP | 2009-265757 | 11/2009 |

* cited by examiner

*Primary Examiner* — Nicholas Lee
(74) *Attorney, Agent, or Firm* — Finnegan, Henderson, Farabow, Garrett & Dunner, L.L.P.

(57) ABSTRACT

An information processing apparatus is provided which includes a first display unit for displaying book data per page, a second display unit provided so as to be adjacent to the first display unit for displaying the book data per page, an axial part provided between the first and second display units, a first detecting unit for detecting rotational angular displacement of the first display unit around the axial part, a second detecting unit for detecting rotational angular displacement of the second display unit around the axial part, and a display page controller for displaying a page N displayed on the first display unit on the second display unit, or displaying the page N displayed on the second display unit on the first display unit, based on the rotational angular displacement of the first display unit and the rotational angular displacement of the second display unit.

7 Claims, 5 Drawing Sheets

INFORMATION PROCESSING APPARATUS AND INFORMATION PROCESSING METHOD

BACKGROUND OF THE INVENTION

1. Field of the Invention

The present invention relates to an information processing apparatus and an information processing method.

2. Description of the Related Art

An e-book reader is an apparatus for displaying content of an e-book and the like on a display and is generally of a size and weight suitable for being carried by a user. In the e-book reader, a method of changing a page of the book is centered on a press of a button provided on the e-book reader and an input using a touch panel, for example.

Also, a technique in which a gyro sensor or an acceleration sensor is provided on the e-book reader to turn the pages displayed on the e-book reader based on a detection result of the sensor is disclosed in Japanese Patent Application Laid-Open Nos. 2003-216300, 2006-323859 and 2003-263144.

SUMMARY OF THE INVENTION

When operating the e-book reader using the button, it is necessary to provide the button on a main body of the e-book reader, and this narrows a screen area of the display. Also, since an action to press the button and an action to turn the pages of the book are not intuitively associated, there has been a problem that it is hard to use. Further, the input using the touch panel requires a hand to operate the touch panel aside from a hand of the user to hold the e-book reader. Also, there has been a problem that operation to a screen lacks intuition.

Also, there is a technique to detect an action (gesture) of the user to shake the apparatus using the gyro sensor, the acceleration sensor and the like. However, when the user shakes the apparatus, a reaction component in a direction opposite to a direction of shaking is also large, so that false detection problematically occurs, and there has been a problem that it is difficult to distinguish the action to shake the apparatus as one gesture of the operation to the apparatus. Furthermore, it is further difficult to associate opposite actions, which are page down and page up of the book, with the action to shake the apparatus, and the action might be completely different from that intended by the user.

In light of the foregoing, it is desirable to provide novel and improved information processing apparatus and information processing method in which the user may more intuitively perform operations of page down and page up in the e-book and the false detection may be reduced.

According to an embodiment of the present invention, there is provided an information processing apparatus, including a first display unit for displaying book data per page, a second display unit provided so as to be adjacent to the first display unit for displaying the book data per page, an axial part provided between the first and second display units, a first detecting unit for detecting rotational angular displacement of the first display unit around the axial part, a second detecting unit for detecting rotational angular displacement of the second display unit around the axial part, and a display page controller for displaying a page N displayed on the first display unit on the second display unit, or displaying the page N displayed on the second display unit on the first display unit, based on the rotational angular displacement of the first display unit and the rotational angular displacement of the second display unit.

The display page controller may judge that the first and second display units shift to a close state when displacement difference between the rotational angular displacement of the first display unit and the rotational angular displacement of the second display unit becomes larger than a predetermined first threshold from an open state of the first and second display units.

The display page controller may judge that the first and second display units shift to the open state again when the displacement difference between the rotational angular displacement of the first display unit and the rotational angular displacement of the second display unit becomes smaller than a predetermined second threshold after the first and second display units shift to the close state.

The display page controller may measure a time period from shift of the first and second display units to the close state to shift of the first and second display units to the open state again to judge whether an open/close action by the user is performed based on a measurement result.

The display page controller may calculate total displacement of the rotational angular displacement of the first display unit and total displacement of the rotational angular displacement of the second display unit after the first and second display units start to shift from the open state to the close state, and displays the page N displayed on the first display unit on the second display unit when judging that the total displacement of the rotational angular displacement of the first display unit is larger than a predetermined third threshold and larger than the total displacement of the rotational angular displacement of the second display unit.

The display page controller may calculate total displacement of the rotational angular displacement of the first display unit and total displacement of the rotational angular displacement of the second display unit after the first and second display units start to shift from the open state to the close state, and displays the page N displayed on the second display unit on the first display unit when judging that the total displacement of the rotational angular displacement of the second display unit is larger than a predetermined third threshold and larger than the total displacement of the rotational angular displacement of the first display unit.

According to another embodiment of the present invention, there is provided an information processing method including the steps of displaying book data on a first display unit per page, displaying the book data on a second display unit provided so as to be adjacent to the first display unit per page, detecting rotational angular displacement of the first display unit around an axial part provided between the first and second display units, detecting rotational angular displacement of the second display unit around the axial part, and displaying a page N displayed on the first display unit on the second display unit, or displaying the page N displayed on the second display unit on the first display unit, based on the rotational angular displacement of the first display unit and the rotational angular displacement of the second display unit.

According to an embodiment of the present invention, the user may more intuitively perform the operations of page down and page up in the e-book, and the false detection may be reduced.

DETAILED DESCRIPTION OF THE EMBODIMENT(S)

Figure 1:
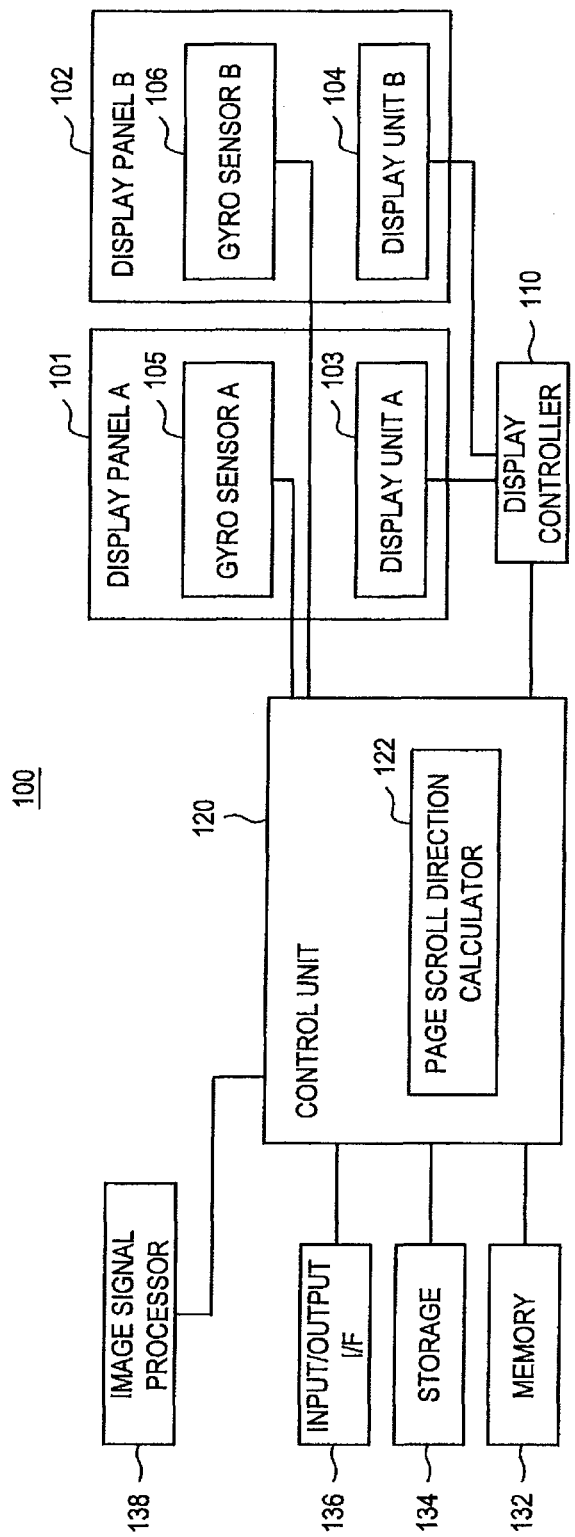
FIG. 1 is a block diagram showing an e-book reader according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. Meanwhile, the description is performed in a following order.
1. Configuration of One Embodiment
2. Action of One Embodiment

1. Configuration of One Embodiment

First, an e-book reader 100 according to one embodiment of the present invention is described. FIG. 1 is a block diagram showing the e-book reader 100 according to this embodiment.

The e-book reader 100 according to this embodiment includes, for example, a display panel [A]101, a display panel [B]102, a display controller 110, a control unit 120, a memory 132, a storage 134, an input/output I/F 136, an image signal processor 138 and the like.

The e-book reader 100 is, for example, an apparatus capable of displaying e-book data, and is generally of a size and weight suitable for being carried by a user. Meanwhile, the e-book reader 100 is an example of an information processing apparatus, and the information processing apparatus may be a personal computer, an audio player, a media player, a personal digital assistant (PDA), a cell-phone and the like.

Figure 2:
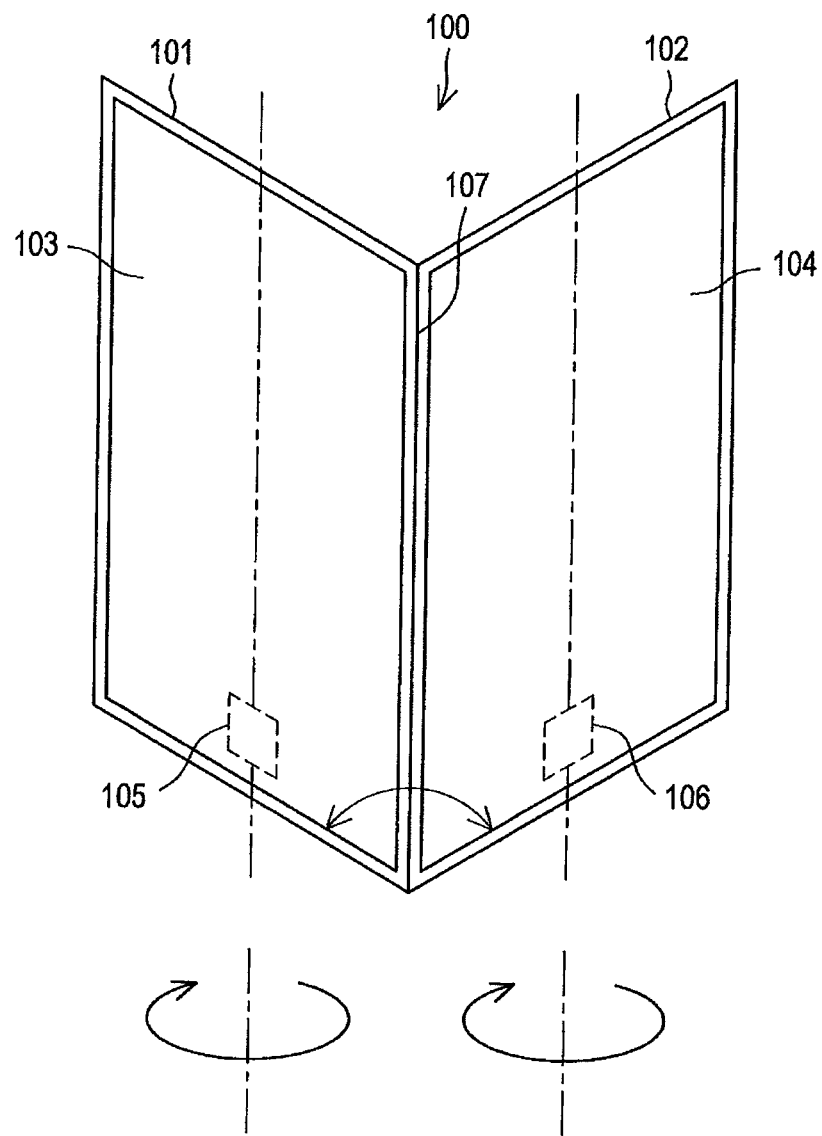
FIG. 2 is an illustration diagram showing an external appearance of the e-book reader according to this embodiment.

The display panels [A]101 and [B]102 constitute an external appearance of the e-book reader 100, as shown in FIG. 2. FIG. 2 is an illustration diagram showing the external appearance of the e-book reader 100 according to this embodiment. FIG. 2 shows a state in which the display panels [A]101 and [B]102 each having a rectangular shape are opened with a certain angle therebetween.

The display panels [A]101 and [B]102 have one side of the rectangle in common, and common parts are connected by means of an axial part 107. The display panels [A]101 and [B]102 rotate around the axial part 107. The display panel [A]101 has a display unit [A]103 and a gyro sensor [A]105, and the display panel [B]102 has a display unit [B]104 and a gyro sensor [B]106. The display unit [A]103 is an example of a first display unit, and the display unit [B]104 is an example of a second display unit. The gyro sensor [A]105 is an example of a first detecting unit, and the gyro sensor [B]106 is an example of a second detecting unit.

The display units [A]103 and [B]104 are, for example, a liquid crystal display, an organic EL display and the like, and are controlled by the display controller 110. The display units [A]103 and [B]104 display a menu screen for displaying a title of data and the like, an image by image data, and each page of a book by the book data. In this embodiment, it is not necessary to provide a button and the like for page down and page up, so that the display units [A]103 and [B]104 may be provided on the display panels [A]101 and [B]102 to have areas, which cover a large part of the display panels [A]101 and [B]102, respectively. The display units [A]103 and [B]104 are assembled so as to be opposed to each other when the display panels [A]101 and [B]102 are closed.

The display controller 110 drives the display units [A]103 and [B]104 by utilizing an input image signal. Because of this, an image corresponding to the image signal is displayed on the screen of the display units [A]103 and [B]104.

The gyro sensors [A]105 and [B]106 are embedded in the display panels [A]101 and [B]102, respectively. The gyro sensors [A]105 and [B]106 may detect an angular speed of rotation around an axis parallel to the axis of the axial part 107. The gyro sensor [A]105 detects rotational angular displacement of the display unit [A]103, and the gyro sensor [B]106 detects the rotational angular displacement of the display unit [B]104. The rotational angular displacement is calculated by integrating the detected angular speed with respect to an elapsed time period. The angular displacement of the rotation around the axis parallel to the axis of the axial part 107 may be calculated using not the gyro sensors [A]105 and [B]106 but an acceleration sensor.

The display controller 110 performs a regeneration process of the image signal received from the image signal processor 138. Also, the display controller 110 performs a synthesis process of display data to generate data, which a user may look at and listen to on the display units [A]103 and [B]104. The data generated in the display controller 110 is output to the display units [A]103 and [B]104.

The control unit 120 has a microcomputer and the like constituted of a central processing unit (CPU), a read only memory (ROM), a random access memory (RAM) and the like assembled to one another, for example. The control unit 120 serves as an arithmetic processing apparatus and a control apparatus by a program to control above-described each component in the e-book reader 100.

The control unit 120 further has a page scroll direction calculator 122. The page scroll direction calculator 122 is an example of a display page controller, and displays a page N displayed on the display unit [A]103 on the display unit [B]104, or displays the page N displayed on the display unit [B]104 on the display unit [A]103, based on the rotational angular displacement of the display unit [A]103 and the rotational angular displacement of the display unit [B]104.

The memory 132 is constituted of a storage unit such as the RAM, the ROM and a cache memory, and has a function to temporarily store data relating to the process of the CPU and an operation program of the CPU of the control unit 120.

The storage 134 is, for example, a hard disk, an optical disk, and a flash memory, and is a storage unit for storing the data for a long time. The storage 134 stores the e-book data and the image data, for example. The storage 134 records the e-book data and the image data through a data reception control process and an accumulation control process in the control unit 120.

The input I/F 136 is, for example, an USB terminal, and an IEEE 1394 terminal, and is an interface connectable to an external apparatus. Various data are input to the e-book reader 100 through the input I/F 136.

The image signal processor 138 performs a decode process to the image signal or performs an image signal process to the image signal to which the decode process is performed. The image signal processor 138 executes various necessary signal processes such as resolution conversion to convert to the number of pixels of the display units [A]103 and [B]104, brightness correction, color correction and gamma correction for the image signal.

2. Action of One Embodiment

Figure 3:
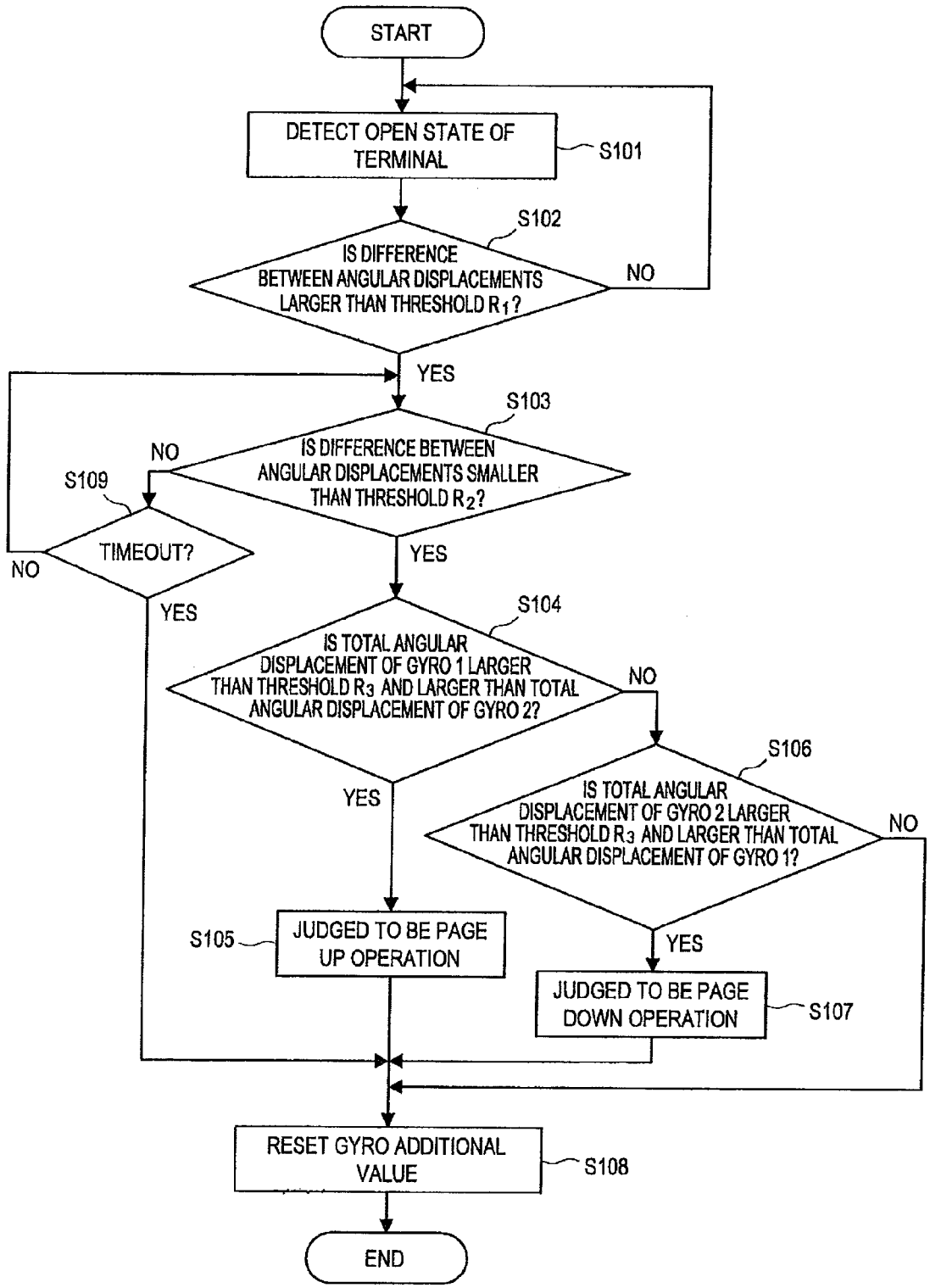
FIG. 3 is a flowchart showing an action of the e-book reader according to this embodiment.
Figure 4:
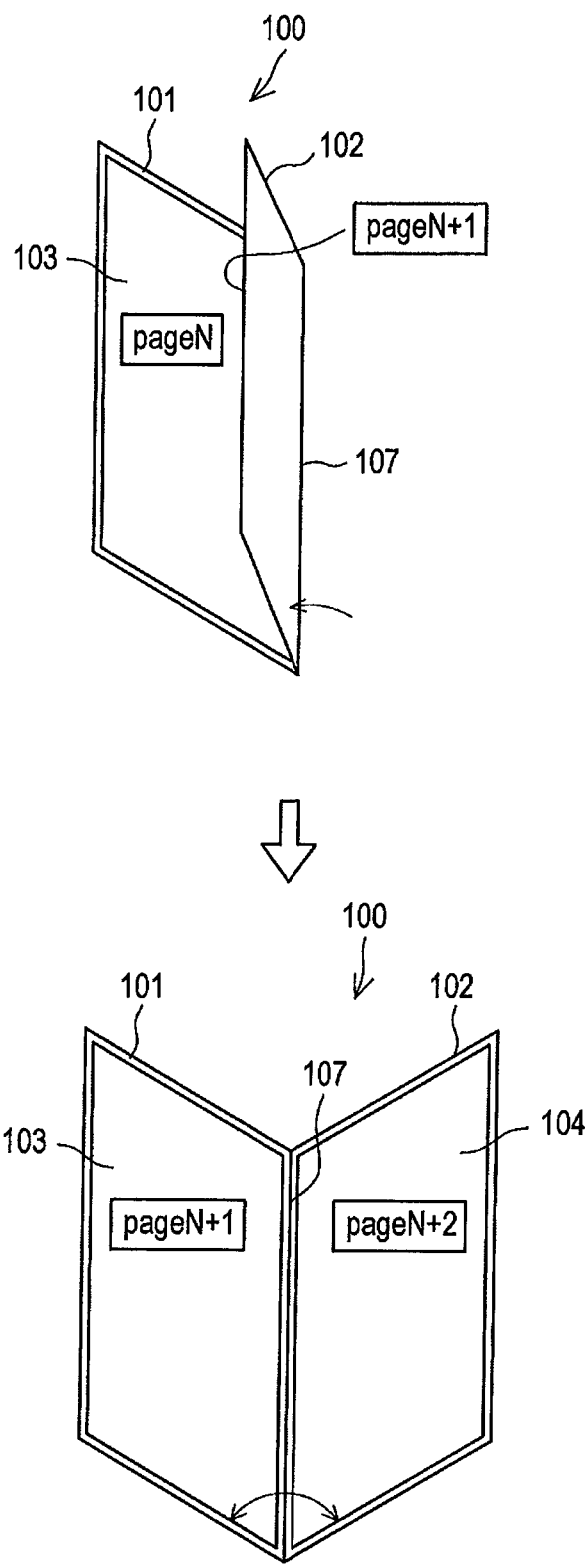
FIG. 4 is an illustration diagram showing a page down action of the e-book reader according to this embodiment.
Figure 5:
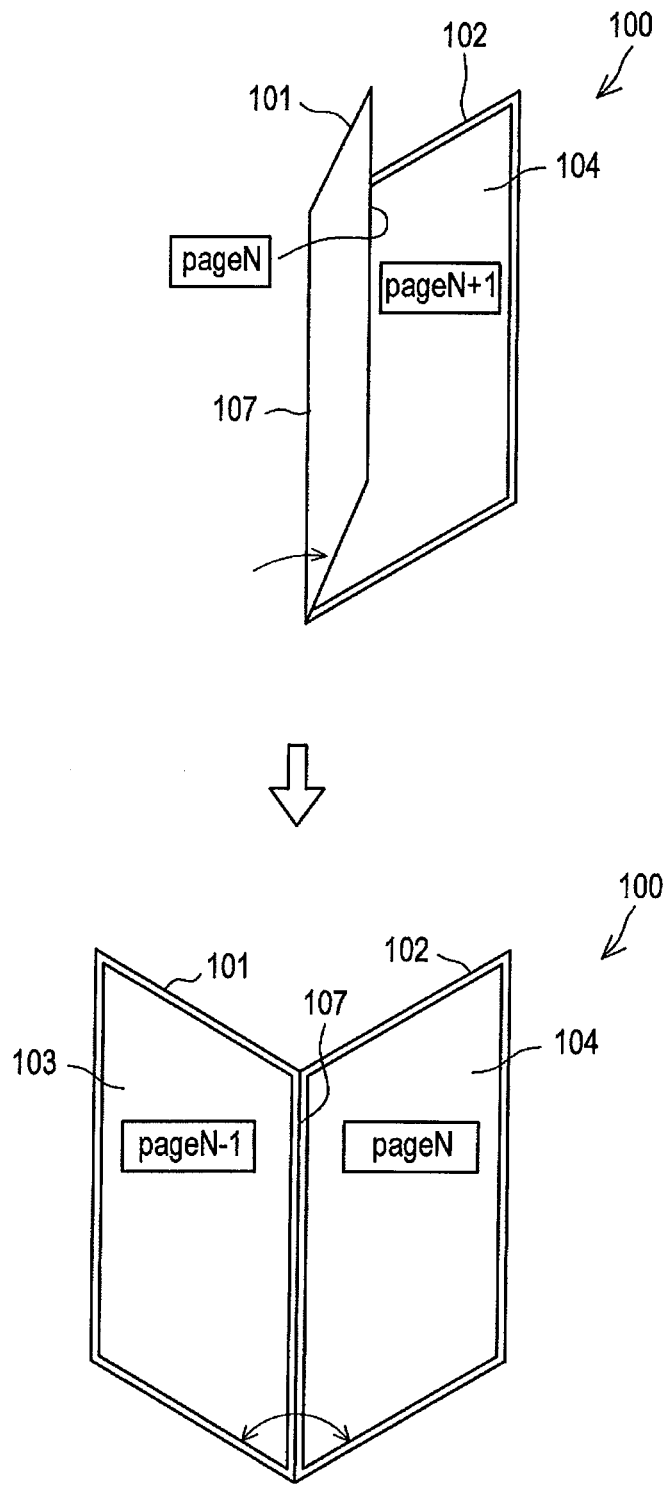
FIG. 5 is an illustration diagram showing a page up action of the e-book reader according to this embodiment.

Next, an action of the e-book reader 100 according to this embodiment is described. FIG. 3 is a flowchart showing the action of the e-book reader 100 according to this embodiment. FIG. 4 is an illustration diagram showing a page down action of the e-book reader 100 according to this embodiment. FIG. 5 is an illustration diagram showing a page up action of the e-book reader 100 according to this embodiment.

First, the e-book reader 100 (terminal) detects that this is in an open state (step S101). The open state is intended to mean a state in which the display panels [A]101 and [B]102 are opened without being opposed. With this, page operation of the e-book reader 100 becomes effective.

Next, displacement difference ($\int G_1 - \int G_2$) between the rotational angular displacement of the gyro sensor [A]105 and the rotational angular displacement of the gyro sensor [B]106 is calculated. Herein, $G_1$ represents the angular speed obtained by the gyro sensor [A]105, and $G_2$ represents the angular speed obtained by the gyro sensor [B]106. $\int G_1$ represents the angular displacement obtained by the gyro sensor [A]105, and $\int G_2$ represents the angular displacement obtained by the gyro sensor [B]106.

From the open state of the display panels [A]101 and [B]102, when the displacement difference between the rotational angular displacement of the display panel [A]101 and the rotational angular displacement of the display panel [B]102 becomes larger than a predetermined first threshold $R_1$, it is judged that the display panels [A]101 and [B]102 shift to a close state to some extent (step S102). At that time, it is desirable to present feedback to the e-book reader 100. Herein, the predetermined first threshold $R_1$ is, for example, $\frac{1}{2}\pi < R_1 < \pi$. The display panels [A]101 and [B]102 are left in the open state until the displacement difference between the rotational angular displacement of the display panel [A]101 and the rotational angular displacement of the display panel [B]102 reaches the predetermined first threshold $R_1$.

Next, the displacement difference of the rotational angular displacement is continuously detected, and when the displacement difference ($\int G_1 - \int G_2$) between the rotational angular displacement of the display panel [A]101 and the rotational angular displacement of the display panel [B]102 becomes smaller than a predetermined second threshold $R_2$ after the display panels [A]101 and [B]102 shift to the close state, it is judged that the display panels [A]101 and [B]102 shift to the open state again (step S103). Herein, the predetermined second threshold $R_2$ is $R_2 < \frac{1}{2}\pi$.

Meanwhile, a time period from the shift of the display panels [A]101 and [B]102 to the close state to the shift of the display panels [A]101 and [B]102 to the open state again is measured, and it is judged whether an open/close action by the user is performed based on a measurement result (step S109). For example, when the measured time period is within a certain time period, it is detected that the e-book reader 100 is closed and thereafter opened for the first time at that point in time.

Also, total displacement ($\int |G_1|$) of the rotational angular displacement of the display panel [A]101 and total displacement ($\int |G_2|$) of the rotational angular displacement of the display panel [B]102 after the display panels [A]101 and [B]102 starting to shift from the open state to the close state are calculated. Then, it is judged whether the total displacement ($\int |G_1|$) of the rotational angular displacement of the display panel [A]101 is larger than a predetermined third threshold $R_3$ and larger than the total displacement ($\int |G_2|$) of the rotational angular displacement of the display panel [B]102 (step S104). Herein, the predetermined third threshold $R_3$ is $\pi < R_3 < 2\pi$. By assuring $\int |G_1| > \int |G_2|$, a case in which the e-book reader 100 itself rotates may be eliminated.

Herein, when all conditions are satisfied, it may be judged that a left side (display panel [A]101 side) of the e-book reader 100 is mainly moved as shown in FIG. 5, and it is judged to be the page up operation (step S105). For example, the page N displayed on the display panel [A]101 is displayed on the display panel [B]102. According to the action, a page N+1 displayed on the display panel [B]102 is changed to the page N, and the page N displayed on the display panel [A]101 is changed to a page N−1.

On the other hand, it is judged whether the total displacement ($\int |G_2|$) of the rotational angular displacement of the display panel [B]102 is larger than the predetermined third threshold $R_3$ and larger than the total displacement ($\int |G_1|$) of the rotational angular displacement of the display panel [A]101 (step S106). Herein, the predetermined third threshold $R_3$ is $\pi < R_3 < 2\pi$. By assuring $\int |G_1| < \int |G_2|$, the case in which the e-book reader 100 itself rotates may be eliminated.

Herein, when all the conditions are satisfied, it may be judged that a right side (display panel [B]102 side) of the e-book reader 100 is mainly moved as shown in FIG. 4, and it is judged to be the page down operation (step S107). For example, the page N+1 displayed on the display panel [B]102 is displayed on the display panel [A]101. According to the action, the page N+1 displayed on the display panel [B]102 is changed to a page N+2, and the page N displayed on the display panel [A]101 is changed to the page N+1.

When it does not correspond to the cases at the steps S104 and S106, it is judged that the e-book reader 100 is just closed and opened, and this does not correspond to either of the page down operation and the page up operation.

When a series of the above-described actions are completed, $\int G_1$, $\int G_2$, $\int |G_1|$ and $\int |G_2|$ are reset to prepare for a next gesture by the user (step S108).

As described above, according to this embodiment, it becomes possible to detect the gesture of the page operation using the gyro sensors. Also, although it is difficult to judge whether to be the page down and the page up with a unique gyro sensor, false detection may be minimized and an effect to prevent false operation may be obtained in this embodiment.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-307661 filed in the Japan Patent Office on 2 Dec. 2008, the entire content of which is hereby incorporated by reference.

What is claimed is:

1. An information processing apparatus, comprising:
a first display unit for displaying book data per page;
a second display unit provided so as to be adjacent to the first display unit for displaying the book data per page;
an axial part provided between the first and second display units;
a first detecting unit for calculating rotational angular displacement of the first display unit around the axial part by detecting the angular speed of the first display unit around the axial part and integrating the first display unit's angular speed with respect to an elapsed time period;
a second detecting unit for, calculating rotational angular displacement of the second display unit around the axial part by detecting the angular speed of the second display unit around the axial part and integrating the second display unit's angular speed with respect to an elapsed time period; and a display page controller configured to change the pages displayed on the first display unit and the second display unit to page up or page down based on the rotational angular displacement of the first display unit and the rotational angular displacement of the second display unit.

2. The information processing apparatus according to claim 1:
wherein
the display page controller judges that the first and second display units shift to a close state when displacement difference between the rotational angular displacement of the first display unit and the rotational angular displacement of the second display unit becomes larger than a predetermined first threshold from an open state of the first and second display units.

3. The information processing apparatus according to claim 2:
wherein
the display page controller judges that the first and second display units shift to the open state again when the displacement difference between the rotational angular displacement of the first display unit and the rotational angular displacement of the second display unit becomes smaller than a predetermined second threshold after the first and second display units shift to the close state.

4. The information processing apparatus according to claim 3:
wherein
the display page controller displays a page N displayed on the first display unit onto the second display unit, or displays the page N displayed on the second display unit onto the first display unit, based on the rotational angular displacement of the first display unit and the rotational angular displacement of the second display unit.

5. The information processing apparatus according to claim 4:
wherein
the display page controller calculates total displacement of the rotational angular displacement of the first display unit and total displacement of the rotational angular displacement of the second display unit after the first and second display units start to shift from the open state to the close state, and displays the page N displayed on the first display unit onto the second display unit when judging that the total displacement of the rotational angular displacement of the first display unit is larger than a predetermined third threshold and larger than the total displacement of the rotational angular displacement of the second display unit.

6. The information processing apparatus according to claim 5:
wherein
the display page controller calculates total displacement of the rotational angular displacement of the first display unit and total displacement of the rotational angular displacement of the second display unit after the first and second display units start to shift from the open state to the close state, and displays the page N displayed on the second display unit onto the first display unit when judging that the total displacement of the rotational angular displacement of the second display unit is larger than a predetermined third threshold and larger than the total displacement of the rotational angular displacement of the first display unit.

7. The information processing method comprising the steps of:
displaying book data on a first display unit per page;
displaying the book data on a second display unit provided so as to be adjacent to the first display unit per page;
calculating rotational angular displacement of the first display unit around an axial part provided between the first and second display units by detecting the angular speed of the first display unit around the axial part and integrating the first display unit's angular speed with respect to an elapsed time period;
calculating rotational angular displacement of the second display unit around the axial part by detecting the angular speed of the second display unit around the axial part and integrating the second display unit's angular speed with respect to an elapsed time period; and
changing the pages displayed on the first display unit and the second display unit to page up or page down based on the rotational angular displacement of the first display unit and the rotational angular displacement of the second display unit.

* * * * *